United States Patent
Kawasaki et al.

(10) Patent No.: US 9,369,014 B2
(45) Date of Patent: *Jun. 14, 2016

(54) ROTOR OF MOTOR AND FAN DRIVING MOTOR INCLUDING ROTOR

(75) Inventors: Hiroaki Kawasaki, Osaka (JP); Yuichi Yoshikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 247 days.

This patent is subject to a terminal disclaimer.

(21) Appl. No.: 13/983,904

(22) PCT Filed: Dec. 6, 2011

(86) PCT No.: PCT/JP2011/006827
§ 371 (c)(1),
(2), (4) Date: Aug. 6, 2013

(87) PCT Pub. No.: WO2012/107981
PCT Pub. Date: Aug. 16, 2012

(65) Prior Publication Data
US 2013/0313934 A1    Nov. 28, 2013

(30) Foreign Application Priority Data

Feb. 10, 2011    (JP) .................................. 2011-026968

(51) Int. Cl.
*H02K 21/12* (2006.01)
*H02K 1/27* (2006.01)

(52) U.S. Cl.
CPC .............. *H02K 1/2706* (2013.01); *H02K 1/276* (2013.01)

(58) Field of Classification Search
CPC ..... H02K 1/276; H02K 1/2706; H02K 21/16; H02K 1/00; H02K 1/27; H02K 1/2766
USPC .............. 310/156.11, 156.46, 156.55, 156.53
See application file for complete search history.

(56) References Cited

U.S. PATENT DOCUMENTS

| 3,979,821 A * | 9/1976 | Noodleman ..................... 29/598 |
| 2002/0067096 A1* | 6/2002 | Yamamoto et al. ........... 310/216 |

(Continued)

FOREIGN PATENT DOCUMENTS

| DE | 10 2005 033 824 A1 | 1/2007 |
| JP | 2001-016809 A | 1/2001 |

(Continued)

OTHER PUBLICATIONS

JP 2001-1258187 translation.*

(Continued)

*Primary Examiner* — Hanh Nguyen
(74) *Attorney, Agent, or Firm* — Brinks Gilson & Lione (57) ABSTRACT

Provided are a rotor of a motor capable of attaining a high-speed rotation by appropriately dispersing a stress exerted on a flux barrier portion while reducing a leakage of magnetic flux, and a fan driving motor including the rotor. A second inner wall surface is greater than a first inner wall surface in length in a cross-section perpendicular to a rotational axis (C). A side wall surface has a flux barrier wall surface extending from each of both ends of the second inner wall surface in the cross-section perpendicular to the rotational axis (C), the flux barrier wall surface extending outward relative to the second inner wall surface in an extending direction of the second inner wall surface and more distant from an outer edge of a rotor as it goes from the second inner wall surface toward the first inner wall surface in the cross-section perpendicular to the rotational axis (C). The permanent magnets are placed such that radially outward polarities of two or more permanent magnets adjacent in the circumferential direction of the rotor are the same in a state in which the permanent magnets are inserted into the slots, respectively.

7 Claims, 8 Drawing Sheets

(56) References Cited

U.S. PATENT DOCUMENTS

| | | |
|---|---|---|
| 2004/0007930 A1 | 1/2004 | Asai et al. |
| 2005/0040723 A1 | 2/2005 | Asai et al. |
| 2007/0257576 A1* | 11/2007 | Adaniya ............... H02K 1/276 310/156.53 |
| 2009/0010782 A1* | 1/2009 | Bartsch et al. ............. 417/423.2 |
| 2011/0050022 A1* | 3/2011 | Li et al. .................... 310/156.46 |
| 2012/0014823 A1* | 1/2012 | Riedl ...................... H02K 1/30 417/423.12 |

FOREIGN PATENT DOCUMENTS

| | | | | |
|---|---|---|---|---|
| JP | 2001258187 | * | 9/2001 | ............... H02K 1/27 |
| JP | 2002-044887 A | | 2/2002 | |
| JP | 2003-309953 A | | 10/2003 | |
| JP | 2008-148391 A | | 6/2008 | |
| JP | 2010-088219 A | | 4/2010 | |
| JP | 2011-015572 A | | 1/2011 | |

OTHER PUBLICATIONS

JP 2008-148391 translation.*

International Search Report for International Application No. PCT/JP2011/006827, dated Jan. 10, 2012, 2 pages.

Office Action and Search Report, and partial English language translation thereof, in corresponding Chinese Application No. 201180067392.8, dated Aug. 5, 2015, 12 pages.

* cited by examiner

ROTOR OF MOTOR AND FAN DRIVING MOTOR INCLUDING ROTOR

This application is a 371 application of PCT/JP2011/006827 having an international filing date of Dec. 6, 2011, which claims priority to JP2011-026968 filed Feb. 10, 2011, the entire contents of which are incorporated herein by reference.

TECHNICAL FIELD

The present invention relates to a rotor of a motor and a fan driving motor including the rotator. Particularly, the present invention relates to a rotor of a brushless motor intended for a high-speed rotation and a fan driving motor including the rotator.

BACKGROUND ART

It is conventionally known that in a permanent magnet embedded brushless motor (IPM motor) configured such that permanent magnets are inserted into slots of a rotor, in order to achieve a higher output and a higher efficiency of the motor, an inner wall surface of a portion of the slot is formed not to contact the permanent magnet, and an iron plate portion between the inner wall surface of the portion of the slot and an outer edge of the rotor which is located radially outward relative to the inner wall surface is formed as a flux barrier portion for reducing a leakage of magnetic flux generated in the permanent magnet. By making the flux barrier portion thus formed as thin as possible, the higher output and the higher efficiency of the motor are achieved.

With the higher output and the higher-speed rotation of the motor, a centrifugal force exerted on the permanent magnet embedded into the slot and a portion of the rotor which is located radially outward relative to the permanent magnet increases. Because of this, if the flux barrier portion is thinned, it may be broken (fractured), so that the permanent magnet and the portion of the rotor which is located radially outward relative to the permanent magnet may fly off. To avoid this, there have been conventionally provided approaches for optimizing a shape of the flux barrier portion to enhance a strength of the flux barrier portion while reducing a leakage of the magnetic flux generated in the permanent magnet (see, e.g., Patent Literatures 1, 2).

Patent Literature 1: Japanese Laid-Open Patent Application Publication No. 2001-16809
Patent Literature 2: Japanese Laid-Open Patent Application Publication No. 2010-88219

However, in the conventional configurations including those disclosed in Patent Literatures 1 and 2, a problem that the flux barrier portion may be broken, occurs, if an attempt is made to rotate the rotor at a higher speed (e.g., a rotational speed which is equal to or greater than 100000 revolutions/minute (rpm)). To prevent the flux barrier portion from being broken, it is considered that the flux barrier portion is made thicker to ensure its strength, or the permanent magnet is reduced in size so that the centrifugal force exerted on the permanent magnet is reduced and thereby a force exerted on the portion of the rotor which is located outward relative to the permanent magnet is reduced. However, such an approach results in a low output and a low efficiency of the motor. Therefore, it is impossible to attain a higher-speed rotation of the motor while reducing a size of the motor.

In particular, it is demanded that a smaller size and a higher output of a fan driving motor applied to a suction fan of a vacuum cleaner can be attained, in order to attain a smaller size and a higher output of the vacuum cleaner. In a conventional fan driving motor, its regular revolutions are typically equal to or less than about 20000 rpm, and regular revolutions of a motor rotating at a high speed are about 40000 to 50000 rpm at most. Thus, a fan driving motor which is able to attain regular revolutions which are more than about 40000 to 50000 rpm has not been put into practice yet.

The present invention is directed to solving the above stated problems associated with the prior arts, and an object is to provide a rotator of a motor which is able to attain a high-speed rotation by appropriately dispersing a stress exerted on a flux barrier portion while reducing a leakage of magnetic flux, and a fan driving motor including the rotator.

Solution to Problem

According to the present invention, there is provided a rotor of a motor in which a permanent magnet is inserted into a slot formed inside of the rotor, the slot including: a first inner wall surface which has a flat shape and is perpendicular to a virtual plane including a center of a rotational axis of the motor and is divided in two by the virtual plane; a second inner wall surface which is located radially outward relative to the first inner wall surface and extends in parallel with the first inner wall surface; and a side wall surface connecting the first inner wall surface and the second inner wall surface to each other; wherein the second inner wall surface is greater than the first inner wall surface in length in a cross-section perpendicular to the rotational axis; and wherein the side wall surface has a flux barrier wall surface extending from each of both ends of the second inner wall surface in the cross-section perpendicular to the rotational axis, the flux barrier wall surface extending outward relative to the second inner wall surface in an extending direction of the second inner wall surface and more distant from an outer edge of the rotor as it goes from the second inner wall surface toward the first inner wall surface in the cross-section perpendicular to the rotational axis, wherein the slot includes four or more slots arranged at equal intervals in a circumferential direction of the rotor; and wherein the permanent magnets are placed such that radially outward polarities of two or more permanent magnets adjacent in the circumferential direction of the rotor are the same in a state in which the permanent magnets are inserted into the slots, respectively.

In accordance with this configuration, since the second inner wall surface is greater than the first inner wall surface located inward relative to the second inner wall surface in length in the cross-section perpendicular to the rotational axis, it becomes possible to prevent a situation in which a stress exerted on a portion of the rotor which is located outward relative to the permanent magnet, due to a centrifugal force generated in the permanent magnet inserted into the slot concentrates on a boundary portion between the second inner wall surface and the side wall surface. In addition, since the side wall surface has the flux barrier wall surface extending more distant from the outer edge of the rotor as it goes from the second inner wall surface toward the first inner wall surface, it becomes possible to prevent a situation in which a stress exerted on the permanent magnet and the portion of the rotor which is located outward relative to the permanent magnet concentrates on the boundary portion between the second inner wall surface and the side wall surface.

Thus, in accordance with this configuration, since a stress exerted on the flux barrier portion can be appropriately dispersed, it becomes possible to construct the rotor which is able to withstand a high-speed rotation without increasing a thickness of the flux barrier portion. As a result, a high-speed rotation of the rotor can be attained while reducing a leakage of magnetic flux.

Furthermore, in accordance with this configuration, the permanent magnets are placed such that the radially outward polarities of the two or more permanent magnets adjacent in the circumferential direction of the rotor are the same in a state in which the permanent magnets are inserted into the four or more slots arranged at equal intervals in the circumferential direction of the rotor, respectively. Thereby, a size of the permanent magnets corresponding to one pole can be reduced. Since a stress caused by a mass of the permanent magnets can be reduced, a high-speed rotation of the rotor can be attained while making the flux barrier portion relatively thinner. Or, in a case where the permanent magnets of an equal size are used, an amount of the magnetic flux increases. Therefore, a higher-speed rotation of the rotor can be attained even when the flux barrier portion has an equal thickness. Since the poles are reduced in number without reducing the magnetic flux of the permanent magnets, it becomes possible to lower a switching frequency for changing a direction of a current flowing through a coil of a stator. Therefore, a higher-speed rotation of the motor can be attained more easily.

The flux barrier wall surface may have a shape of a circular-arc in the cross-section perpendicular to the rotational axis; and the circular-arc may be configured such that a center of a virtual circle including the circular-arc is located between the first inner wall surface and the center of the rotational axis within the virtual plane, and the virtual circle is located inward relative to the outer edge of the rotor in the cross-section perpendicular to the rotational axis. This structure makes it possible to appropriately disperse the stress exerted on the permanent magnet and the portion of the rotor which is located outward relative to the permanent magnet, and exert the stress on the flux barrier portion in a direction inclined with respect to a radial direction. Since the stress exerted on the flux barrier portion is dispersed to be mitigated, and a direction of the stress exerted on the flux barrier portion is a direction in which the flux barrier portion is durable against a break (the flux barrier portion could withstand a break), it becomes possible to effectively prevent the flux barrier portion from being broken.

The side wall surface may a positioning wall surface which is located inward in a lengthwise direction of the second inner wall surface relative to each of the both ends of the second inner wall surface and is perpendicular to the second inner wall surface, and a connecting wall surface connecting the positioning wall surface to the flux barrier wall surface, in the cross-section perpendicular to the rotational axis. This makes it possible to prevent a displacement of the permanent magnet while appropriately forming the flux barrier wall surface.

The slot may have grooves which are located radially inward relative to the first inner wall surface and each of which is formed between the side wall surface and a corresponding one of both ends of the first inner wall surface. This makes it possible to process a connecting portion between the side wall surface and the first inner wall surface to provide a sharp shape, and manufacture the connecting portion between the side wall surface and the first inner wall surface with a high accuracy, during manufacturing of the rotor.

The slot may include four slots arranged in a circumferential direction of the rotor; and the permanent magnets may be placed such that radially outward polarities of the permanent magnets which face each other with the rotational axis interposed between the permanent magnets are different from each other in a state in which the permanent magnets are inserted into the slots, respectively. Thus, adequate revolutions can be attained by the permanent magnets which are minimum necessary in number.

The permanent magnet inserted into the slot may be made of a rare-earth element. By using the permanent magnet formed so to have a high magnetic force using the rare-earth element, a smaller size and a higher output of the rotor can be attained.

A fan driving motor of the present invention comprises the rotor of the motor having the above configuration. By applying to the fan driving motor, the rotor of the motor which is able to attain a high-speed rotation while reducing a leakage of magnetic flux, because of the above structure, a smaller size and a higher output of the motor can be attained.

The above and further objects, features and advantages of the invention will more fully be apparent from the following detailed description with reference to the accompanying drawings.

Advantageous Effects of the Invention

The present invention is configured as described above, and it is possible to achieve advantages that a high-speed rotation can be attained by appropriately dispersing a stress exerted on a flux barrier portion while reducing a leakage of magnetic flux.

DETAILED DESCRIPTION OF THE PREFERRED EMBODIMENTS

Hereinafter, an embodiment of the present invention will be described with reference to the drawings. Hereinafter, throughout the drawings, the same or corresponding components are identified by the same reference symbols, and will not be described in repetition.

Figure 1:
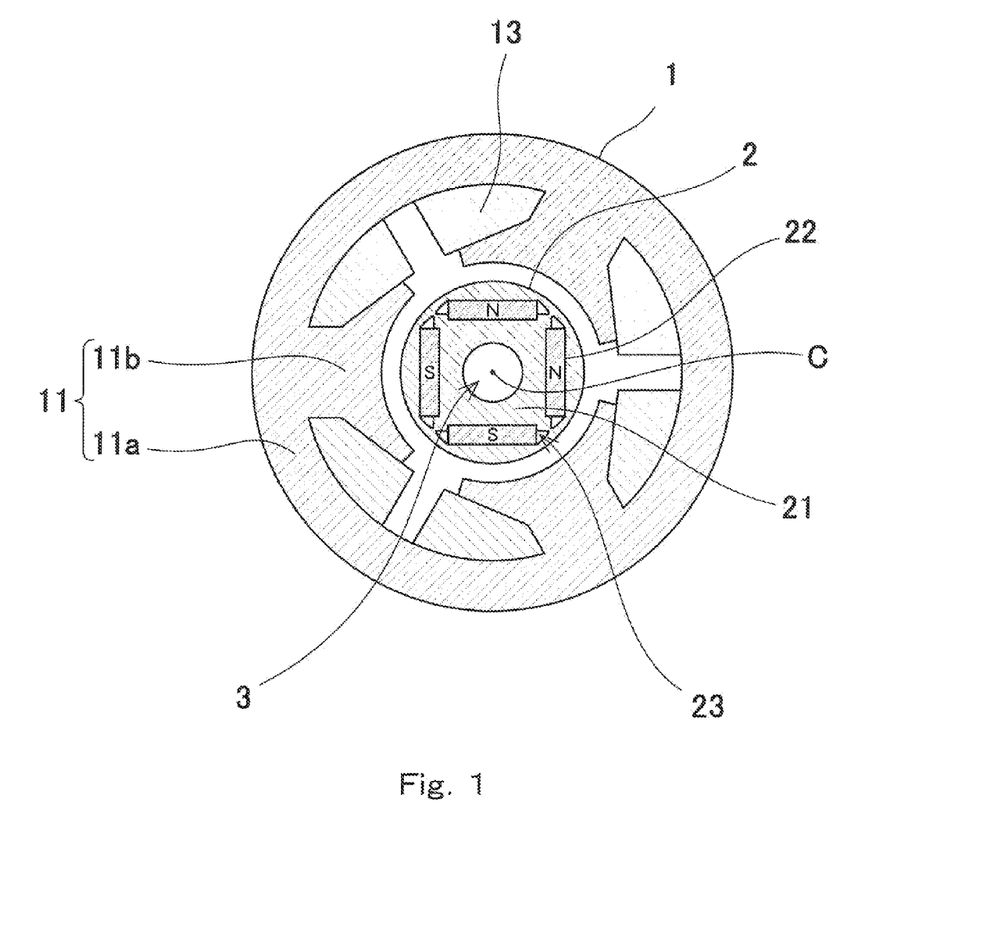
FIG. 1 is a cross-sectional view showing a cross-sectional structure of a motor including a rotator of a motor according to an embodiment of the present invention.

FIG. 1 is a cross-sectional view showing a cross-sectional structure of a motor including a rotator of a motor according to an embodiment of the present invention. As shown in FIG. 1, a brushless motor (hereinafter will be simply referred to as motor) of the present embodiment includes a tubular stator 1 attached to an inner wall surface of an outer frame (not shown) and a tubular rotor 2 retained at an inner side of the stator 1 such that the rotor 2 is rotatable with respect to the stator 1. The rotor 2 is provided with a shaft hole 3 in a center portion thereof. In a state in which a shaft (not shown) is inserted into the shaft hole 3, the rotor 2 and the shaft are fastened to each other.

The stator 1 includes a stator core 11 having a tubular portion 11a having a tubular shape and a plurality of (three in the present embodiment) teeth portions 11b extending radially inward from an inner wall surface of the tubular portion 11a and coils 12 wounded around the teeth portions 11b, respectively. The rotor 2 includes a tubular rotor core 21 and permanent magnets 22 embedded into a plurality of (four in the present embodiment) slots 23 formed in a circumferential direction (circumferential direction of a rotational axis C) of the rotor 2 inside of the rotor core 21. In the present embodiment, the four slots 23 are arranged at equal intervals in the circumferential direction of the rotor 2.

The permanent magnets 22 have a plate shape. Corner portions of the permanent magnets 22 may be chamfered or rounded. This makes it possible to prevent the permanent magnets 22 from getting broken (fractured), or cracked in manufacturing. As the permanent magnets 22, rare-earth magnets formed using a rare-earth element such as neodymium are used. By using the permanent magnets 22 formed so as to have a high magnetic force using the rare-earth element, a smaller size and a higher output of the rotor 2 can be attained.

In the present embodiment, the permanent magnets 22 are placed such that radially outward polarities of two permanent magnets 22 adjacent in a circumferential direction of the rotor 2 are the same in a state in which the permanent magnets 22 are inserted into the slots 23, respectively. In other words, the permanent magnets 22 are placed such that the radially outward polarities of the permanent magnets 22, which face each other with the rotational axis C interposed between them, are different from each other (In FIG. 1, only the radially outward polarities of the permanent magnets 22 are represented on the permanent magnets 22, respectively). Thus, the two-pole rotor 2 is constructed using the four permanent magnets 4.

Since one pole is formed using the two permanent magnets 22 as described above, a size of the permanent magnets 22 corresponding to one pole can be reduced. Since a stress caused by a mass of the permanent magnets 22 can be thus reduced, a high-speed rotation of the rotor 2 can be attained while making the flux barrier portion 21a relatively thinner. Also, in a case where the permanent magnets 22 of an equal size are used, an amount of the magnetic flux increases. Therefore, a higher-speed rotation of the rotor 2 can be attained even when the flux barrier portion 21a has an equal thickness.

To enable the motor to rotate a high speed, it becomes necessary to increase a switching frequency which determines a cycle in which a direction of a current flowing through the coil 12 is changed. By comparison, with an increase in the poles, it becomes necessary to perform switching of the coil 12 correspondingly. Therefore, the switching frequency is required to be increased to implement equal revolutions. On the other hand, if the permanent magnets 22 are reduced in number, the magnetic flux emanating from the permanent magnet 22 is reduced, so that a higher efficiency of the motor cannot be attained.

In view of the above, in the present embodiment, the permanent magnets 22 are placed such that the radially outward polarities of the two permanent magnets 22 adjacent in the circumferential direction of the rotor 2 are the same in a state in which the permanent magnets 22 are inserted into the slots 23, respectively. This makes it possible to reduce the poles in number without reducing the magnetic flux of the permanent magnets 22 and lower the switching frequency for changing the direction of the current flowing through the coil 12 of the stator 1. Therefore, a high-speed rotation of the motor can be attained more easily. Since the four permanent magnets 22 are used, adequate revolutions can be attained by the permanent magnets 22 which are minimum necessary in number, and hence a high-performance motor can be constructed while avoiding an increase in cost. The rotor core 21 and the permanent magnets 22 may be fastened to each other by a suitable adhesive.

In the motor configured as described above, by changing a direction of a current flowing through the coils 12 of the stator 1, the shaft and the rotor 2 rotate around the rotational axis C with respect to the stator 1 with a center axis of the shaft being the rotating axis C.

Figure 2:
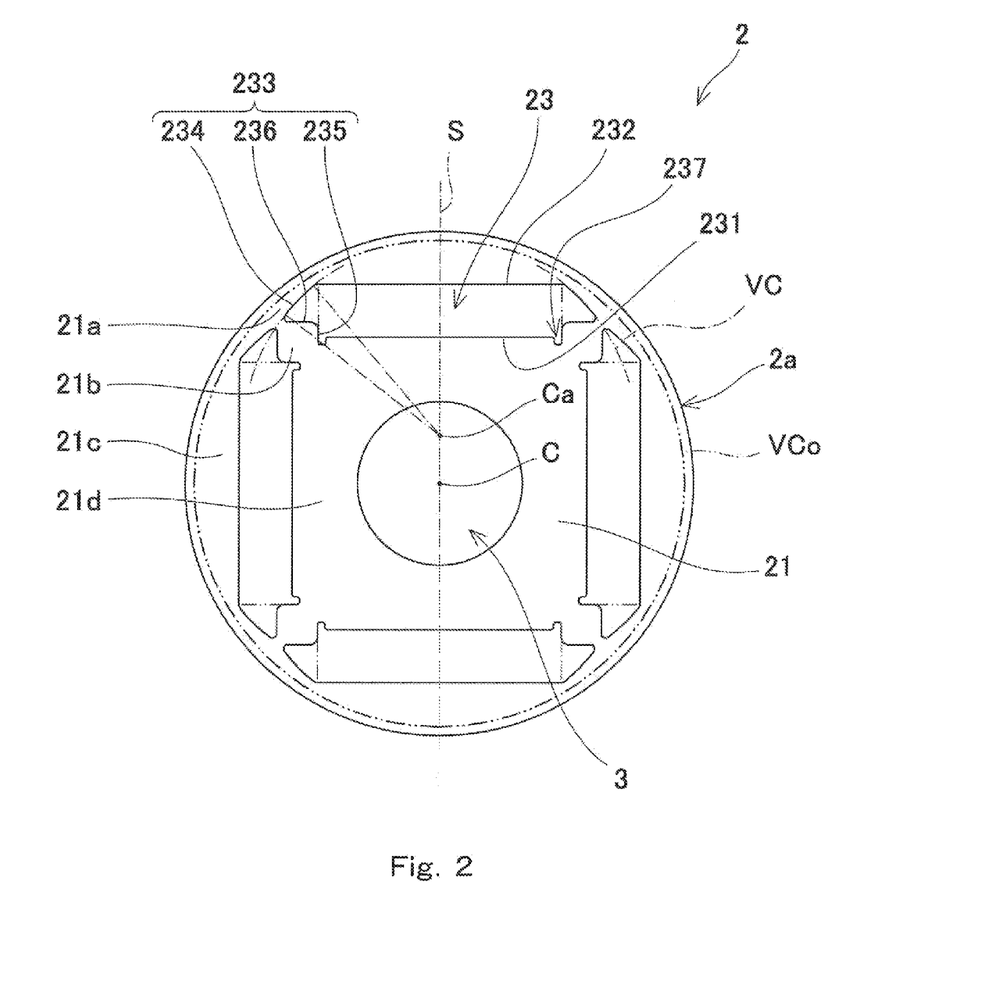
FIG. 2 is an enlarged view showing a cross-sectional structure of the rotor of the motor of FIG. 1.

FIG. 2 is an enlarged view showing a cross-sectional structure of the rotor of the motor of FIG. 1. As shown in FIG. 2, each of the slots 23 formed in the rotor 2 has a first inner wall surface 231 which has a flat shape and is perpendicular to a virtual plane (line segment in the cross-sectional view in FIG. 2) S including a center of the rotational axis C of the motor and is divided in two by the virtual plane S, a second inner wall surface 232 which is located radially outward relative to the first inner wall surface 231 and extends in parallel with the first inner wall surface 231 and side wall surfaces 233 connecting the first inner wall surface 231 to the second inner wall surface 232. The second inner wall surface 232 is greater than the first inner wall surface 231 in length in the cross-section perpendicular to the rotational axis C (i.e. length in the cross-section of FIG. 2).

Each of the side surfaces 233 has a flux barrier wall surface 234 extending from each of both ends of the second inner wall surface 232 in the cross-section perpendicular to the rotational axis C, the flux barrier wall surface 234 extending outward relative to the second inner wall surface 232 in an extending direction (lengthwise direction in the cross-section of FIG. 2) of the second inner wall surface 232 and more distant from an outer edge 2a of the rotor 2 as it goes from the second inner wall surface 232 toward the first inner wall surface 231, in the cross-section perpendicular to the rotational axis C. A rotor core portion between the flux barrier wall surface 234 and the outer edge 2a constitute a flux barrier portion 21a. Because of presence of the flux barrier portion 21a having such a structure, a gap formed by the slot 23 is formed between the flux barrier wall surface 234 and the permanent magnet 22 in a state in which the permanent magnet 22 is inserted into the slot 23. Therefore, it becomes possible to prevent a situation in which magnetic flux generated in the permanent magnet 22 leaks to the permanent magnet 22 adjacent in the circumferential direction and becomes ineffective magnetic flux. The side wall surface 233 has a positioning wall surface 235 which is located inward in the lengthwise direction of the second inner wall surface 232 relative to each of the both ends of the second inner wall surface 232 and is perpendicular to the second inner wall surface 232, and a connecting wall surface 236 connecting the positioning wall surface 235 to the flux barrier wall surface 234, in the cross-section perpendicular to the rotational axis C. In addition, the slot 23 has grooves 237 which are located radially inward relative to the first inner wall surface 231 and each of which is formed between the side wall surface 233 and the corresponding one of both ends of the first inner wall surface 231.

As described above, the rotor 2 of the present embodiment has the four slots 23. More specifically, the four slots 23 are configured such that the first inner wall surfaces 231 of adjacent slots 23 are perpendicular to each other, and the second inner wall surfaces 232 of adjacent slots 23 are perpendicular to each other. The flux barrier portion 21a, the positioning wall surfaces 235 of adjacent slots 23, and the connecting wall surfaces 236 of adjacent slots 23 constitute a bridge portion 21b connecting an outer peripheral portion 21c of the rotor core 21 which is located radially outward relative to the second inner wall surface 232 to a center portion 21d of the rotor core 21 which is located radially inward relative to the first inner wall surface 231.

The plate-shaped permanent magnet 22 is inserted into the slot 23 configured as described above. Since the second inner wall surface 232 is greater than the first inner wall surface 231 which is located inward relative to the second inner wall surface 232 in the length of the cross-section perpendicular to the rotational axis C, outer corner portions of the permanent magnet 22 are located inward relative to the both ends of the second inner wall surface 232 in the state in which the plate-shaped permanent magnet 22 is inserted into the slot 23. Because of this structure, it becomes possible to prevent a situation in which when the rotor 2 is rotating around the rotational axis C, a stress exerted on a portion (outer peripheral portion 21c) of the rotor 2 which is located outward relative to the permanent magnet 22, due to a centrifugal force generated in the permanent magnet 22 inserted into the slot 23 concentrates on a boundary portion between the second inner wall surface 232 and the side wall surface 233.

In addition, because of presence of the positioning wall surface 235 as described above, a displacement of the permanent magnet 22 can be prevented while appropriately forming the flux barrier wall surface 234. Furthermore, because of presence of the grooves 237 each of which is formed between the side wall surface 233 (positioning wall surface 235) and the first inner wall surface 231, it becomes possible to process a connecting portion between the side wall surface 233 (positioning wall surface 235) and the first inner wall surface 231 to provide a sharp shape, and manufacture the connecting portion between the side wall surface 233 and the first inner wall surface 231 with a high accuracy, during manufacturing of the rotor 2. This allows the permanent magnet 22 to be positioned within the slot 23 with a high accuracy. Therefore, a displacement of the permanent magnet 22 can be prevented more effectively.

When the rotor 2 is rotating around the rotating axis C, the stress corresponding the centrifugal force exerted on the permanent magnet 22 and the portion (outer peripheral portion 21c) of the rotor 2 which is located outward relative to the permanent magnet 22, is exerted on the flux barrier portion 21a. In the present embodiment, since the side wall surface 233 has the flux barrier wall surface 234 extending more distant from the outer edge 2a of the rotor 2 as it goes from the second inner wall surface 232 toward the first inner wall surface 231, it becomes possible to prevent a situation in which the stress exerted on the permanent magnet 22 and the outer peripheral portion 21c concentrates on the boundary portion between the second inner wall surface 232 and the side wall surface 233.

Thus, in accordance with the above configuration, since the stress exerted on the flux barrier portion 21a can be appropriately dispersed, it becomes possible to construct the rotor 2 which is able to withstand a high-speed rotation without increasing the thickness of the flux barrier portion 21a. Therefore, a high-speed rotation of the rotor 2 can be attained while reducing a leakage of the magnetic flux.

Figure 3:
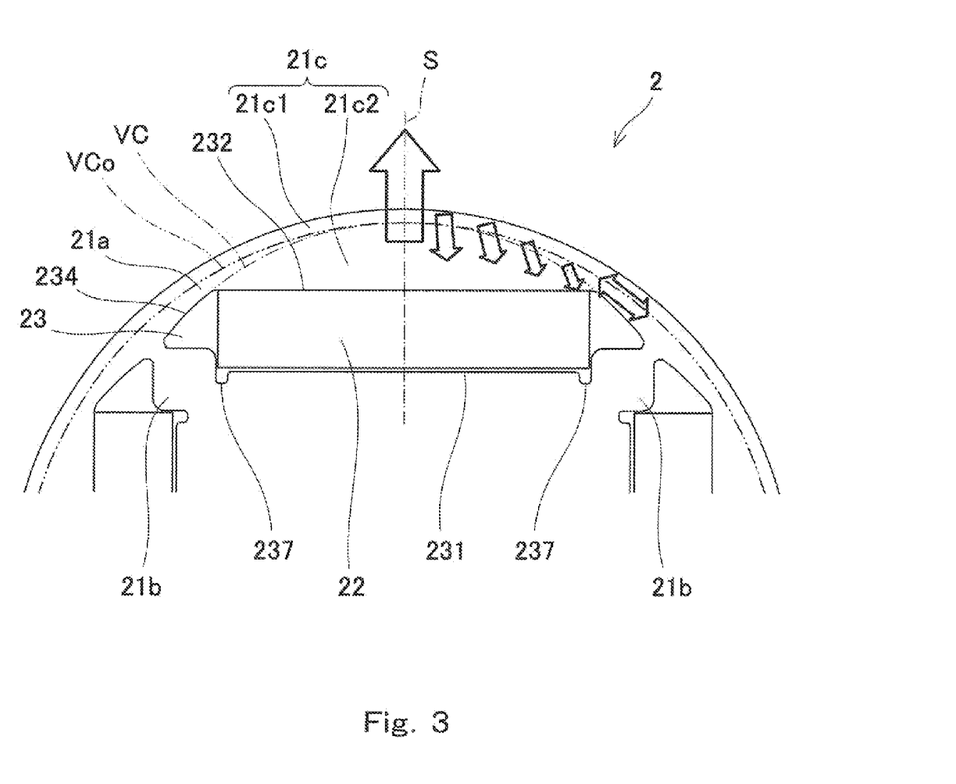
FIG. 3 is an enlarged cross-sectional view showing a cross-sectional structure of the rotor of the motor of FIG. 1.

Hereinafter, the structure of the flux barrier portion 21a of the present embodiment will be described in greater detail. FIG. 3 is an enlarged cross-sectional view showing a cross-sectional structure of the rotor of the motor of FIG. 1. As shown in FIGS. 2 and 3, the flux barrier wall surface 234 defining the flux barrier portion 21a has a shape of a circular-arc in the cross-section perpendicular to the rotational axis C. The circular-arc is configured such that a center Ca of a virtual circle VC including the circular-arc is located between the first inner wall surface 231 and the center of the rotational axis C within the virtual plane S, and the virtual circle VC is located inward relative to the outer edge 2a of the rotor 2 (virtual circle VC is present inside of the rotor 2). That is, on the virtual plane S, the virtual circle VC contacts a virtual concentric circle VCo of the outer edge 2a which has a center which is the center of the rotational axis C of the rotor 2 and has a smaller radius than the outer edge 2a (the virtual circle VC has a smaller radius than the virtual concentric circle VCo). In other words, the circular-arc is configured such that the virtual concentric circle VCo which has the center which is the center of the rotational axis C of the rotor 2 and contacts the virtual circle VC on the virtual plane S has a smaller radius than the outer edge 2a.

When the rotor 2 is rotating around the rotational axis C, the permanent magnet 22 and the outer peripheral portion 21c which is located outward relative to the permanent magnet 22 receive the centrifugal force together. From a stress distribution generated at this time, mass points at which the centrifugal force is generated may be assumed to be a mass point in an outer portion 21c1 which is located outward relative to the virtual circle VC which is an extension of the flux barrier wall surface 234 and a mass point in an inner portion 21c2 which is located inward relative to the virtual circle VC. In other words, it seems as if a centrifugal force caused by a sum of a mass of the permanent magnet 22 and a mass of the inner portion 21c2 of the outer peripheral portion 21c which is located inward relative to the virtual circle VC is exerted on the outer portion 21c1 of the outer peripheral portion 21c which is located outward relative to the virtual circle VC.

In the present embodiment, the outer portion 21c1 of the outer peripheral portion 21c which is located outward relative to the virtual circle VC, has a radial thickness which increases from a region of the outer portion 21c1 which crosses the virtual plane S toward the bridge portion 21b. Because of this, a stress exerted on the outer portion 21c1 of the outer peripheral portion 21c which is located outward relative to the virtual circle VC, the stress corresponding to the centrifugal force caused by the sum of the mass of the permanent magnet 22 and the mass of the inner portion 21c2 of the outer peripheral portion 21c which is located inward relative to the virtual circle VC, is more mitigated as a whole as it goes from the region of the outer portion 21c1 which crosses the virtual plane S toward the bridge portion 21b. Regarding a direction of components of the stress, a radial component decreases more and a tangential component increases more as it goes from the region of the outer portion 21c1 which crosses the virtual plane S toward the bridge portion 21b. A stress which is substantially parallel to a tangential direction (circumferential direction of the rotor 2) of the outer edge 2a is exerted on a region of the flux barrier portion 21a in the vicinity of the bridge portion 21b. The strength of the bridge portion 21b is smaller in the radial direction and is greater in the tangential direction, because of its shape. Therefore, even when the stress which is substantially parallel to the tangential direction is exerted on the flux barrier portion 21a, the bridge portion 21b is less likely to be broken (fractured).

This structure makes it possible to appropriately disperse the stress exerted on the permanent magnet 22 and the portion (outer peripheral portion 21c) of the rotor 2 which is located outward relative to the permanent magnet 22, and exert the stress on the flux barrier portion 21a in a direction inclined with respect to the radial direction. Since the stress exerted on the flux barrier portion 21a is dispersed to be mitigated, and a direction of the stress exerted on the flux barrier portion 21a is a direction in which the flux barrier portion of 21a is durable against a break (fracture) (the flux barrier portion could withstand a break), it becomes possible to effectively prevent the flux barrier portion 21a from being broken.

Figure 7:
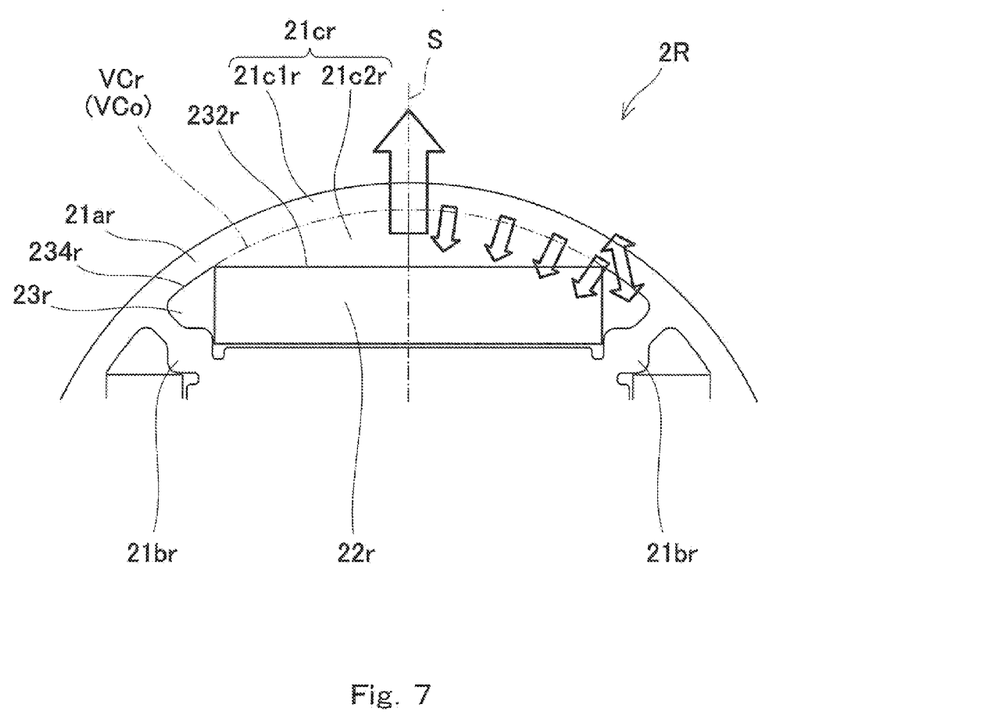
FIG. 7 is an enlarged cross-sectional view showing a cross-sectional structure of a rotor according to a comparative example with respect to the present invention.

For the purpose of comparison, a description will be given of how a stress is exerted on a rotor having a structure in which a circular-arc of a flux barrier wall surface is configured such that a virtual circle VCr including the circular-arc conforms to the virtual concentric circle VCo. FIG. 7 is an enlarged cross-sectional view showing a cross-sectional structure of the rotor according to a comparative example with respect to the present invention.

In a rotor 2R in the comparative example, the circular-arc of a flux barrier wall surface 234r is configured such that a center of the virtual circle VCr including the circular-arc conforms to the center of the virtual concentric circle VCr which is the center of the rotational axis C.

In the comparative example, also, when the rotor 2R is rotating around the rotational axis C, a permanent magnet 22r and an outer peripheral portion 21cr which is located outward relative to the permanent magnet 22r receive a centrifugal force together. From a stress distribution generated at this time, mass points at which the centrifugal force is generated are assumed to be a mass point in an outer portion 21c1r which is located outward relative to the virtual circle VCr which is an extension of the circular-arc of the flux barrier wall surface 234r and a mass point in an inner portion 21c2r which is located inward relative to the virtual circle VCr. In other words, it seems as if a centrifugal force caused by a sum of a mass of the permanent magnet 22r, and a mass of the inner portion 21c2r of the outer peripheral portion 21cr which is located inward relative to the virtual circle VCr, is exerted on the outer portion 21c1r of the outer peripheral portion 21cr which is located outward relative to the virtual circle VCr.

In the comparative example, the outer portion 21c1r of the outer peripheral portion 21cr which is located outward relative to the virtual circle VCr, has a radial thickness which is constant from a region of the outer portion 21c1r which crosses the virtual plane S toward a bridge portion 21br. Because of this, a stress exerted on the outer portion 21c1r of the outer peripheral portion 21cr which is located outward relative to the virtual circle VCr, the stress corresponding to the centrifugal force caused by the sum of the mass of the permanent magnet 22r and the mass of the inner portion 21c2r of the outer peripheral portion 21cr which is located inward relative to the virtual circle VCr is substantially uniform in the radial direction, from a region of the outer portion 21c1r which crosses the virtual plane S toward the bridge portion 21br. Therefore, a relatively great stress is exerted in the radial direction on a region of the flux barrier portion 21ar in the vicinity of the bridge portion 21br. As described above, the strength of the bridge portion 21br is smaller in the radial direction and is greater in the tangential direction, because of its shape. As a result, when a radial stress acts on the flux barrier portion 21ar, the stress concentrates on the flux barrier portion 21ar (especially, portion at which a corner portion of the permanent magnet contacts) which is thinner than the outer peripheral portion 21cr. Thereby, a degree of deformation of the bridge portion 21br which is caused by the rotation of the rotor 2R increases, which causes the bridge portion 21br to be broken easily. To prevent the bridge portion 21br from being broken, it is necessary to increase the thickness of the flux barrier portion 21ar. If the thickness of the flux barrier portion 21ar is increased, a leakage of the magnetic flux increases and therefore an induced voltage decreases. As a result, a higher efficiency of the motor cannot be expected.

In another comparative example (not shown), in a case where a circular-arc of a flux barrier wall surface is configured such that the center Ca of the virtual circle VC including the circular-arc is located between the first inner wall surface 231 and the center of the rotational axis C within the virtual plane S, but the virtual circle VC is located outward relative to the outer edge 2a of the rotor 2 (the virtual concentric circle VCo has a greater radius than the outer edge 2a), a stress caused by rotation of the rotor 2 concentrates on a boundary portion between the second inner wall surface 232 and the flux barrier wall surface. Or, in another comparative example (not shown), in a case where a circular-arc of a flux barrier wall surface is configured such that the center Ca of the virtual circle VC including the circular-arc is located closer to the slot 23 facing the slot 23 defined by this flux barrier wall surface, than the center of the rotational axis C within the virtual plane S (the virtual circle VC has a greater radius than the virtual concentric circle VCo), a stress concentrates on an end portion (boundary portion between the flux barrier wall surface and the connecting wall surface) of the flux barrier wall surface which is at an opposite side of the boundary portion between the flux barrier wall surface and the second inner wall surface 232. If the stress concentrates on the flux barrier portion, the bridge portion is broken more easily.

In contrast to these structures, in the rotor 2 of the present embodiment, as described above, a component of the stress exerted on the flux barrier portion 21a which is thinner than the outer peripheral portion 21c is greater in the tangential direction and smaller in the radial direction, and the stress itself is mitigated. Because of this, the stress does not concentrate on the flux barrier portion 21a. Thus, it becomes possible to lessen deformation of the bridge portion 21b caused by the rotation of the rotor 2, and hence effectively prevent the bridge portion 21b from being broken. Thus, a higher-speed rotation of the motor can be attained without increasing the thickness of the flux barrier portion 21a and the thickness of the bridge portion 21b. Since a leakage of the magnetic flux can be lessened by making the flux barrier portion 21a relatively thinner, a required induced voltage can be attained even when the permanent magnet 22 is reduced in size (effective utilization ratio of the magnetic flux corresponding to a dimension of the permanent magnet can be increased). Since the higher-speed rotation can be attained while reducing a leakage of the magnetic flux, a smaller size and a higher output of the motor can be attained.

In particular, when the above mentioned motor is applied to a fan driving motor applied to a suction fan of a vacuum cleaner, etc., a smaller size and a higher output of the vacuum cleaner can be attained. (e.g., its regular revolutions are equal to or greater than 80000 rpm).

Figure 4:
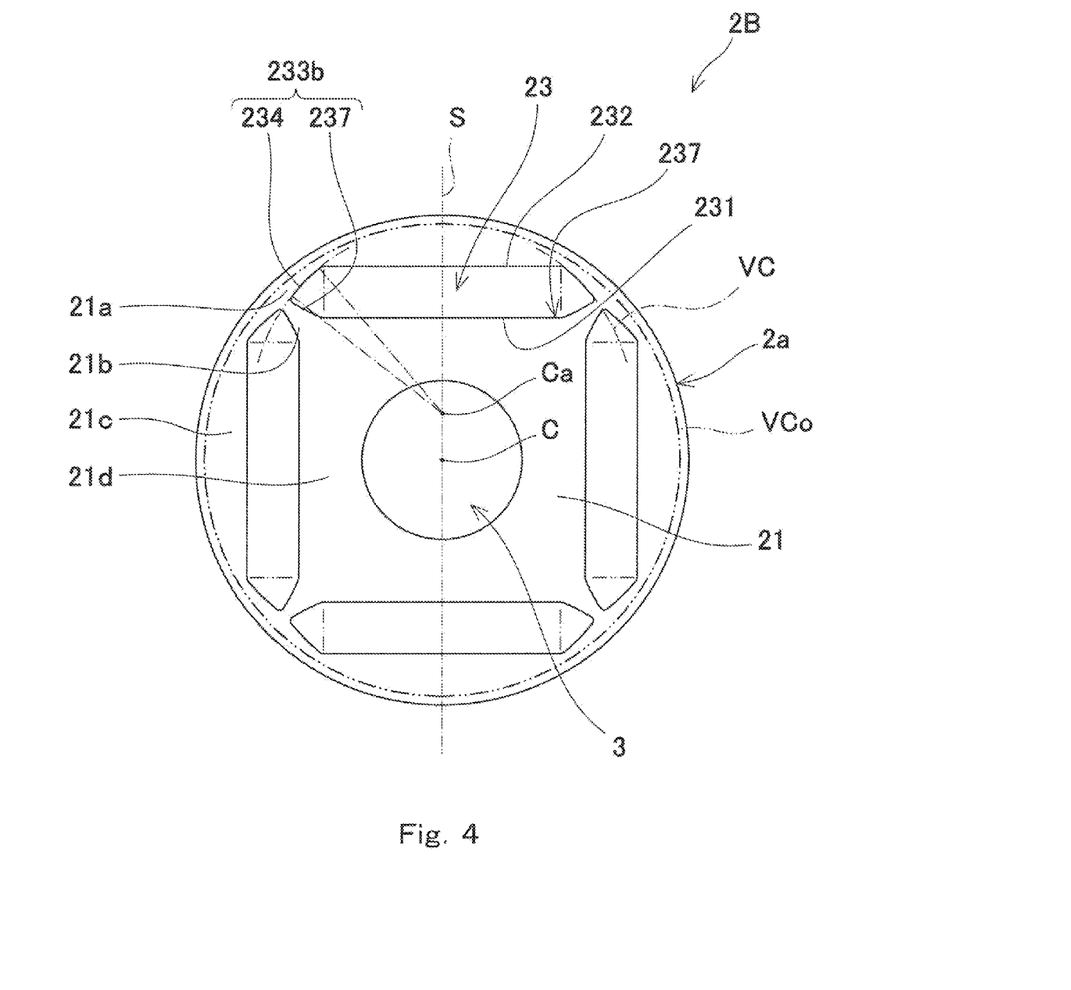
FIG. 4 is an enlarged view showing a cross-sectional structure of a rotator of a motor according to a modified example of the embodiment of the present invention.

Although in the present embodiment, the side wall surface 233 has a structure in which the positioning wall surface 235 and the connecting wall surface 236 are formed between the flux barrier wall surface 234 and the first inner wall surface 231, a shape of portions of the side wall surface 233 which are other than the flux barrier wall surface 234 is not particularly limited. FIG. 4 is an enlarged view showing a cross-sectional structure of a rotator of a motor according to a modified example of the embodiment of the present invention. In a rotor 2B of the motor of FIG. 4, a side wall surface 233b has a flat connecting wall surface 237 connecting each of both ends of the first inner wall surface 231 to the corresponding flux barrier wall surface 234. Specifically, the flat connecting wall surface 237 of the modified example has a linear shape in the cross-section perpendicular to the rotational axis C. Such a shape allows the permanent magnet 22 inserted into the slot 23 to be positioned within the slot 23. As should be understood, the shape of a portion connecting the flux barrier wall surface 234 to the inner wall surface 231 in the side wall surface 233 is not limited to the shapes of the above embodiment and the modified example and may be configured variously.

Example 1

Hereinafter, the strength of the rotor (example, i.e., present example) formed to include the flux barrier surface 234 as described in the above embodiment and the strength of the rotor (comparative example) formed such that the flux barrier portion defined by the flux barrier wall surface 234r has a constant width as in the comparative example of FIG. 7 were analyzed, and results of the analysis will be described below. By the analysis of the strength, stress distribution views in the respective rotors, corresponding to predetermined revolutions (80000 rpm) were obtained. As the rotor cores of the example and the comparative example, the same iron plate material having an equal yield stress (413 MPa) was used, each of the rotor cores was provided with four slots, and permanent magnets made of the same material were inserted into the four slots, respectively. The dimension of the permanent magnets was such that a thickness (radial dimension) was equal in the example and the comparative example, whereas a width (tangential dimension) was 9.5 mm in the example and was 10 mm in the comparative example. The width of the flux barrier portion was 0.7 mm (width of a thinnest portion in the example) in the example and the comparative example. The analysis of strength was conducted using ¼ model of each rotor.

Figure 5:
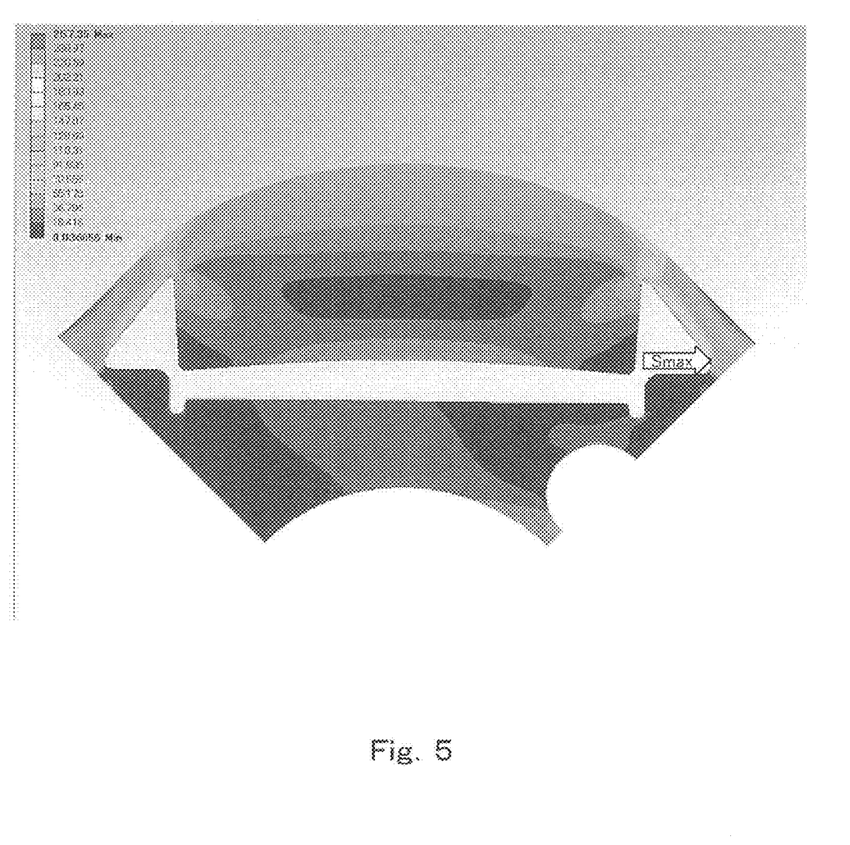
FIG. 5 is a stress distribution view of a rotor according to an example of the present invention.
Figure 8:
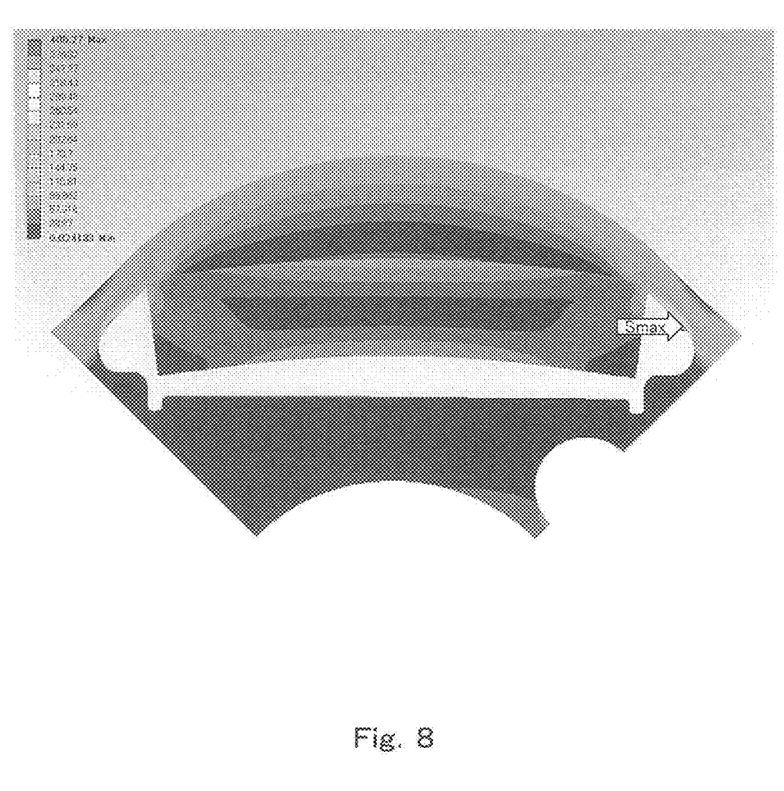
FIG. 8 is a stress distribution view of the rotor according to the comparative example with respect to the present invention.

FIG. 5 is a stress distribution view of the rotor according to the example of the present invention. FIG. 8 is a stress distribution view of the rotor according to the comparative example with respect to the present invention. In the comparative example, as shown in FIG. 8, the stress was distributed in a stepwise stripe shape along an outer periphery of the rotor core. From this, it can be understood that the stress caused by the centrifugal force was exerted uniformly on the outer peripheral portion as compared to the example of FIG. 5. In addition, from outer shapes of the rotors, it was found that a deformation amount of the rotor was greater as a whole in the comparative example of FIG. 8 than in the example of FIG. 5. In FIGS. 5 and 8, a portion on which a maximum stress was exerted is indicated by arrow Smax. A maximum stress which was a stress value at Smax was 257.4 MPa in the example of FIG. 5, while a maximum stress which was a stress value at Smax was 405.3 MPa in the comparative example of FIG. 8. Thus, the maximum stress in the rotor of the comparative example was much greater than the maximum stress in the rotor of the example. It is estimated that this was due to the fact that the stress was exerted on the entire region of the flux barrier wall surface in the example of FIG. 5, while the stress concentrated on only a region near the arrow Smax in the flux barrier wall surface in the comparative example of FIG. 8. As should be understood, the stress which was substantially equal to the yield stress was exerted on the rotor of the comparative example. Therefore, if the rotor of the comparative example is rotated at regular revolutions of 80000 rpm, there is a fear that the rotor will be deformed significantly or broken. On the other hand, the stress which was much smaller than the yield stress was exerted on the rotor of the example. It was revealed that a problem did not arise if the rotor was rotated at regular revolutions of 80000 rpm.

Example 2

Figure 6:
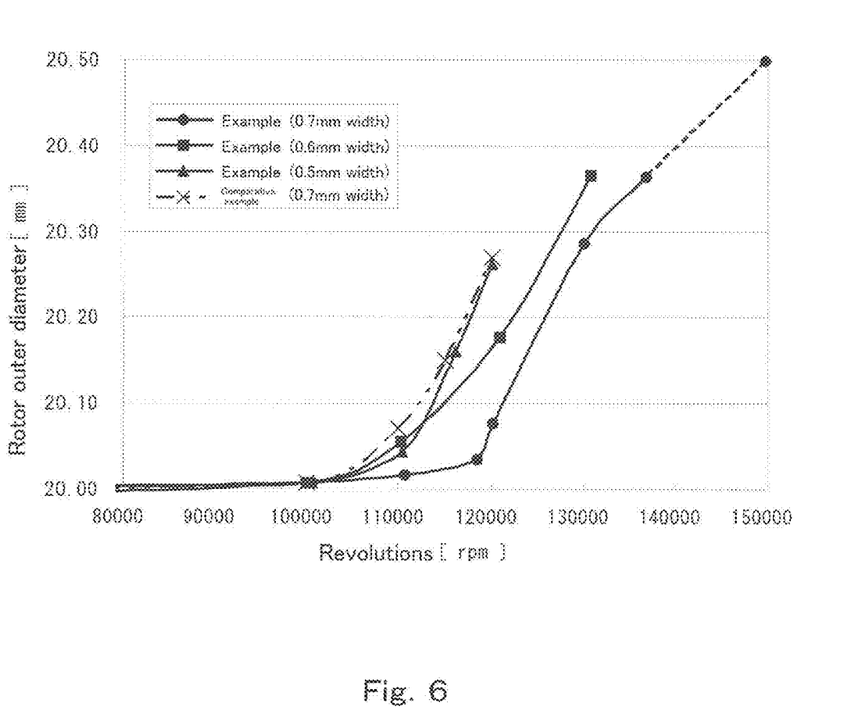
FIG. 6 is a graph showing an outer diameter value of the rotor corresponding to revolutions in a case where the rotor according to the example of the present invention is rotated.

Next, a description will be given of a result of a strength test of the rotor 2 which is conducted by rotating the rotor 2 of the present invention described in the above described embodiment around the rotational axis C. FIG. 6 is a graph showing an outer diameter value of the rotor corresponding to revolutions in a case where the rotor according to the example of the present invention is rotated. When the rotor 2 rotates around the rotational axis C, the rotor 2 is deformed in such a way that the outer peripheral portion 21c of the rotor core 21 is pulled outward by the centrifugal force generated in the permanent magnet 22 and the outer peripheral portion 21c. A deformation amount of the rotor 2 increases as the revolutions of the rotor 2 increase. If the deformation amount of the rotor 2 reaches its upper limit, the rotor 2 will/may be broken. Thus, by measuring the outer diameter value of the rotor 2 corresponding to the revolutions of the rotor 2, the strength of the rotor 2 can be confirmed.

In the example (present example), three rotors were actually manufactured in such a way that they had the shape described in the above embodiment and were different from each other in width (thickness of a thinnest portion between the flux barrier wall surface 234 and the outer edge 2a) of the flux barrier portion 21a (width: 0.5 mm, 0.6 mm, and 0.7 mm). Then, each rotor 2 was rotated in a state in which the permanent magnets 22 were inserted, and the outer diameters of the rotor 2 in cases where its revolutions were 60000 rpm, 80000 rpm, 100000 rpm, 120000 rpm, and 150000 rpm were measured. The outer diameters of the rotor 2 were measured in such a manner that diameters at three locations (both end portions and center portion) in a direction of the rotational axis C, each of which was between centers (within the virtual plane S) of the permanent magnets 22 facing each other, among the four permanent magnets 22, were measured, i.e., diameters at six locations in total were measured, and an average value of the diameters was calculated. As a comparative example, regarding the rotor of FIGS. 7 and 8, a deformation amount corresponding to the revolutions was estimated from analysis data in Example 1, and was shown in FIG. 5 together with results of the example.

As shown in FIG. 6, in the present example, all of the rotors including the rotor having the flux barrier portion 21a with a smallest 0.5 mm width were not substantially deformed until their revolutions reached 100000 rpm. From this, it was revealed that the rotor of the example could be used practically in the operation at revolutions which were equal to or greater than at least 80000 rpm. Among this, deformation of the rotor having the flux barrier portion 21a with a 0.7 mm width was lessened to a small amount until its revolutions reached about 120000 rpm. This rotor was able to rotate at a very high speed until its revolutions finally reached 148000 rpm and thereby the bridge portion 21b was broken. By comparison, the strength of the rotor of the comparative example was similar to that in the graph of the example in which the rotor had the flux barrier portion with a 0.5 mm width. It was revealed that the rotor of the comparative example including the flux barrier portion with a 0.7 mm width could attain only a strength which was close to the strength of the rotor of the example including the flux barrier portion 21a with a 0.5 mm width. From the above, it was revealed that the strength of the rotor in the example of the present invention was much greater than that of the comparative example, without increasing the thickness of the flux barrier portion 21a.

Thus far, the embodiment of the present invention has been described. The present invention is not limited to the above embodiment and the embodiment can be improved, changed or modified in various ways without departing from a spirit of the invention. For example, although in the above embodiment, the rotor 2 is provided with the four slots 23, and the radially outward polarities of two or more permanent magnets 22 adjacent in the circumferential direction of the rotor 2 are the same in a state in which the permanent magnets 22 are inserted into the slots 23, respectively (two-pole rotor), four or more permanent magnets 22 may be used in the present invention so long as the rotor 2 has the above described structure. For example, a rotor may be provided with six slots and radially outward polarities of three permanent magnets adjacent in the circumferential direction of the rotor are the same in a state in which the permanent magnets are inserted into the slots, respectively (two-pole rotor). Or, for example, a rotor may be provided with eight slots and radially outward polarities of two (in the case of four-pole rotor) or four (in the case of two-pole rotor) permanent magnets adjacent in the circumferential direction of the rotor may be the same in a state in which the permanent magnets are inserted into the slots, respectively. Or, slots of another number and poles of another number may be employed.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

A rotor of a motor and a fan driving motor including the rotor, of the present invention, are able to attain a high-speed rotation by appropriately dispersing a stress exerted on a flux barrier portion while reducing a leakage of magnetic flux.

The invention claimed is:

1. A rotor of a motor comprising:
   four or more slots formed at an equal angular interval inside of the rotor in a circumferential direction of the motor; and
   four or more permanent magnets inserted in the four or more slots, respectively, each of the slots being formed with:
   a first inner wall surface which comprises a flat surface having a depth extending in parallel to the rotational axis and a width located between a rotational axis of the motor and an outer periphery of the rotor in a cross-section perpendicular to the rotational axis and extending in the cross-section perpendicular to an imaginary plane that includes the rotational axis and bisects the first inner wall surface in the cross-section;
   a second inner wall surface which has a depth extending in parallel to the depth of the first inner wall surface and a width located in the cross-section radially outward of the first inner wall surface and extending in the cross-section in parallel with the width of the first inner wall surface; and
   a pair of side wall surfaces shaped symmetrically in the cross-section with respect to the imaginary plane;
   wherein the width of the second inner wall surface is longer than the width of the first inner wall surface in the cross-section,
   wherein the pair of side wall surfaces each comprise a flux barrier wall surface extending in the cross-section from one end of the second inner wall surface to a terminal end of the flux barrier wall surface so that in each of the flux barrier wall surface, a radial distance in the cross-section between the outer periphery of the rotor and the flux barrier wall surface, which is measured at a location in the cross-section on the flux barrier wall surface, becomes wider as the location moves along the flux barrier wall surface away from the second inner wall surface in the cross-section, and
   wherein the four or more permanent magnets are placed, respectively, in the four or more slots each having the pair of flux barrier wall surfaces and comprise sets of two or more permanent magnets adjacently arranged in circumferential series in each set, wherein in each set, the two or more permanent magnets have the same radially outward polarity.

2. The rotor of the motor according to claim 1,
   wherein the flux barrier wall surface extends in an arcuate manner along its entire length so that both of the flux barrier wall surfaces are co-extensive in the cross-section along their entire lengths with a single imaginary circle running in the cross-section between the outer periphery of the rotor and the second inner wall surface, the imaginary circle having a center in the cross-section between the rotational axis and the first inner wall surface on a intersecting line between the imaginary plane and the cross-section.

3. The rotor of the motor according to claim 1, wherein the slot further comprising a pair of positioning grooves each having first and second ends, the pair of positioning grooves each being continuous at its first end with one end of the first inner wall surface, and
   wherein each of the side wall surface further comprises (i) a positioning wall surface extending in the cross-section form the second end of a positioning groove perpendicularly towards the second inner wall surface and terminating in the cross-section between the first and second inner wall surfaces and (ii) a connecting wall surface connecting a terminal end of the positioning wall surface and the terminal end of the flux barrier wall surface in the cross-section.

4. The rotor of the motor according to claim 1, wherein the slot has grooves running in parallel to the rotational axis, respectively, at the ends of the first inner wall surface.

5. The rotor of the motor according to claim 1,
   wherein there are a total of four slots arranged at a 90 degree interval in the circumferential direction of the rotor, and there are four permanent magnets placed, respectively, in the four slots, the four permanent magnets comprising two sets of two magnets adjacently arranged in circumferential series, and
   wherein the two magnets in each set have the same radially outward polarity, the two sets have the opposite radially outward polarity, and two magnets in the different sets opposing to each other through the rotational axis have the opposite radially outward polarities.

6. The rotor of the motor according to claim 1, wherein the permanent magnets inserted into the slots are made of a rare-earth element.

7. A fan driving motor comprising the rotor of the motor recited in claim 1, the rotor being retained inside the stator for rotation relative to the stator, wherein the rotor is formed with four slots arranged at equal angular intervals in a circumferential direction of the rotor, the permanent magnet is inserted in each of the four slots, and wherein the stator is formed generally in a tubular shape and includes three teeth portions arranged at equal angular intervals in a circumferential direction of the stator, the three teeth portions each extending radially inward from an inner wall surface of the stator.

* * * * *